(No Model.)
W. G. BARTLETT & J. W. McCOY.
PIPE WRENCH.
No. 421,023. Patented Feb. 11, 1890.
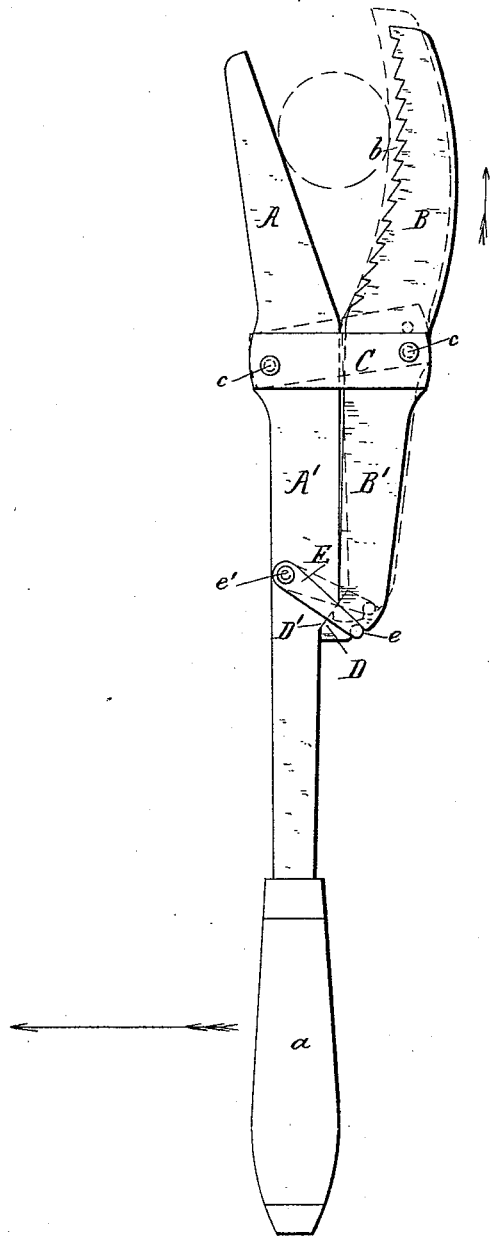
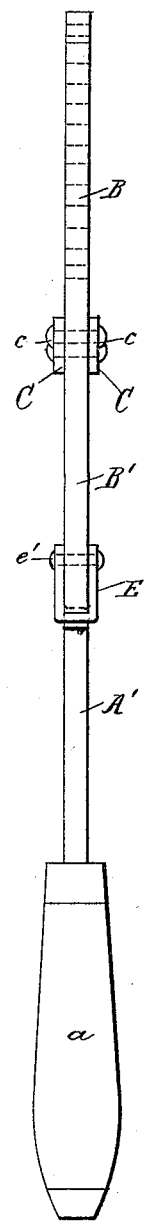
WITNESSES
Geo. L. Wheelock
J. Wm. Lister
INVENTORS.
W. G. Bartlett & J. W. McCoy
by Herbert W. T. Jenner.
Attorney

UNITED STATES PATENT OFFICE.

WILLIAM GEORGE BARTLETT AND JOHN WILLIAM McCOY, OF CAMP CHARLOTTE, TEXAS.

PIPE-WRENCH.

SPECIFICATION forming part of Letters Patent No. 421,023, dated February 11, 1890.

Application filed September 16, 1889. Serial No. 323,992. (No model.)

*To all whom it may concern:*

Be it known that we, WILLIAM GEORGE BARTLETT and JOHN WILLIAM McCOY, citizens of the United States, residing at Camp Charlotte, in the county of Tom Green and State of Texas, have invented certain new and useful Improvements in Pipe-Wrenches; and we do hereby declare the following to be a full, clear, and exact description of the invention, such as will enable others skilled in the art to which it appertains to make and use the same.

This invention relates to pipe-wrenches; and it consists in the novel construction and combination of the parts hereinafter fully described and claimed, whereby the jaws of the wrench are automatically adjusted to different sizes of pipes and are adapted to grip them tightly.

In the drawings, Figure 1 is a front view of the wrench, and Fig. 2 is a side view of the same.

A is the stationary slanting jaw, provided with the shank A' and the handle a.

B is the movable curved jaw, provided with teeth b.

C are links, and c are pins, by means of which the movable jaw is pivotally connected to the shank of the stationary jaw.

B' is the shank of the movable jaw, provided at its end with the inclined portion D, which works upon the inclined portion D', formed on the shank of the stationary jaw.

E is a loop, which engages with the notch e on shank B', and is pivoted to the shank A' of the stationary jaw by the pin e'. The slanting and curved jaws are from their shape adapted to engage with pipes of different sizes. When the handle is turned in the direction of the large arrow, the toothed jaw moves in the direction of the small arrow more or less toward the position indicated by the dotted lines in Fig. 1, the said movement being caused by the resistance of the pipe to the action of the wrench. This resistance causes the wrench to automatically adapt itself to the exact size of the pipe, so that the teeth can get a good and firm hold upon its circumference, and the continued application of force to the wrench-handle in the direction of the large arrow only causes the jaws to grip the pipe more tightly.

A very slight reverse motion of the wrench-handle disengages the wrench-jaws from the pipe without breaking any of the teeth.

The loop E permits the incline D to slide up and down the incline D'; but prevents the sliding jaw from having any more motion than is sufficient to grip the pipes, and it holds the jaws in position ready to engage with the pipes.

What we claim is—

1. In a pipe-wrench, the combination, with a stationary jaw provided with a shank and an inclined portion on the shank, of a movable jaw pivotally connected to said shank, and also provided with a shank having an inclined portion adapted to slide upon the aforesaid stationary inclined portion, and a coupling device, substantially as described and shown, attached to the two said shanks and permitting them to be moved apart for a limited distance.

2. In a pipe-wrench, the combination, with the stationary jaw provided with a shank having an inclined portion on it, of a movable jaw, also provided with a shank and an inclined portion adapted to slide upon the aforesaid inclined portion, the pivoted coupling-loop permitting the two said shanks to be moved a limited distance apart, and the links and pivot-pins connecting said jaws together, substantially as and for the purpose set forth.

3. In a pipe-wrench, the combination, with the stationary jaw provided with a shank and an inclined portion on the shank, of a movable jaw, also provided with a shank, having an inclined portion on it and pivotally connected to the stationary jaw, and a loop pivoted to the stationary jaw and engaging with the shank of the movable jaw, whereby the said two inclined portions are retained in working position, substantially as set forth.

In testimony whereof we affix our signatures in presence of two witnesses.

WILLIAM GEORGE BARTLETT.
JOHN WILLIAM McCOY.

Witnesses:
W. GORDON STILES,
ADOLFO BARELA.